Aug. 18, 1964  J. K. GAUNT ETAL  3,144,743
TOPPING DEVICE FOR SUGAR CANE HARVESTER
Filed March 27, 1961  3 Sheets-Sheet 1
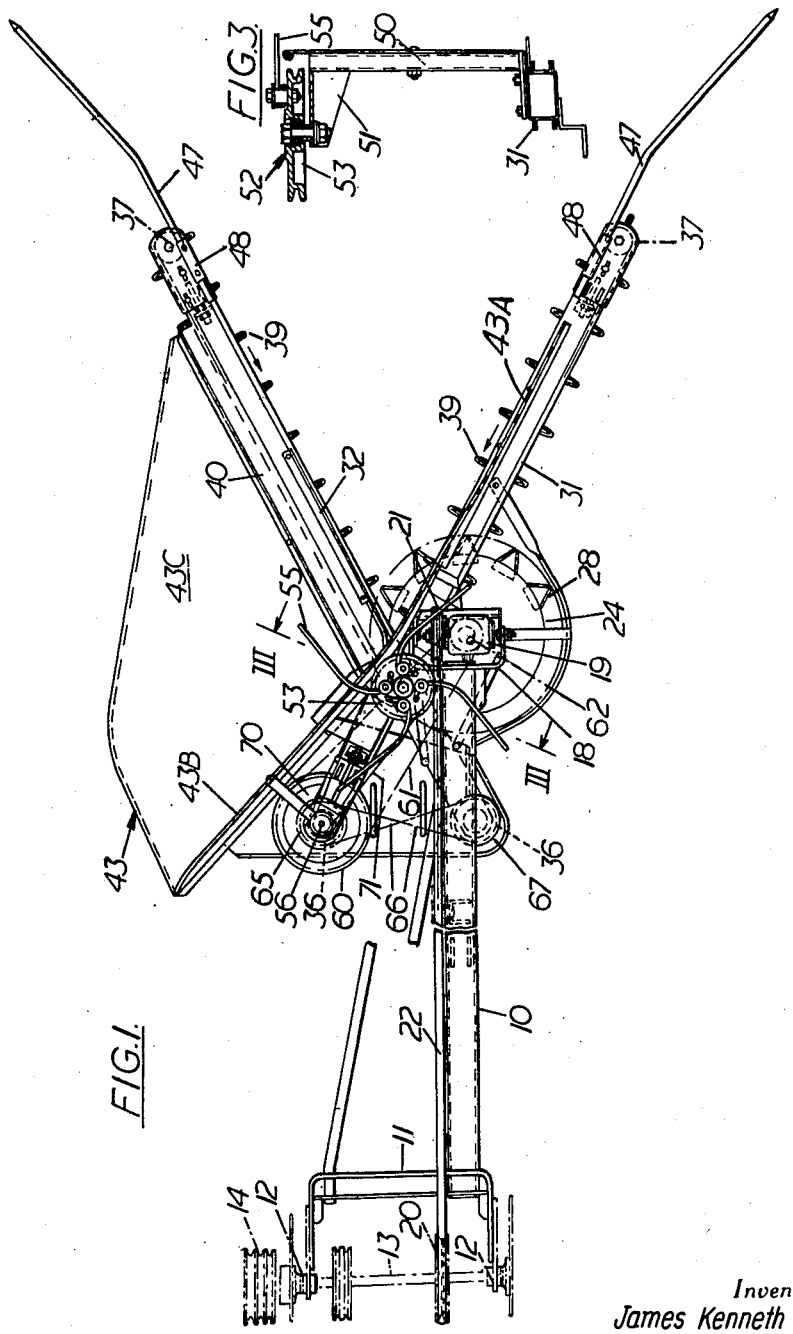
Inventors
James Kenneth Gaunt,
James Wood &
John Errington Douglas.
By
Wolfe, Hubbard, Voit & Osann Attorneys

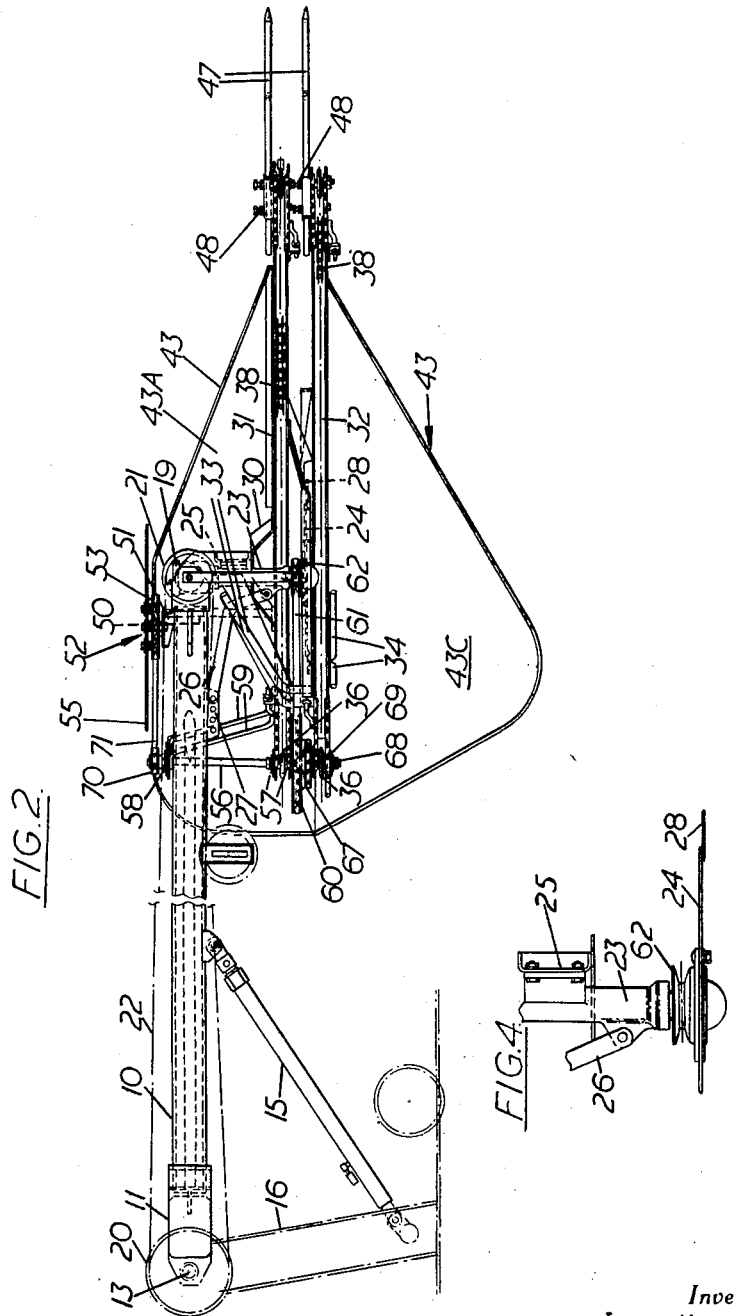

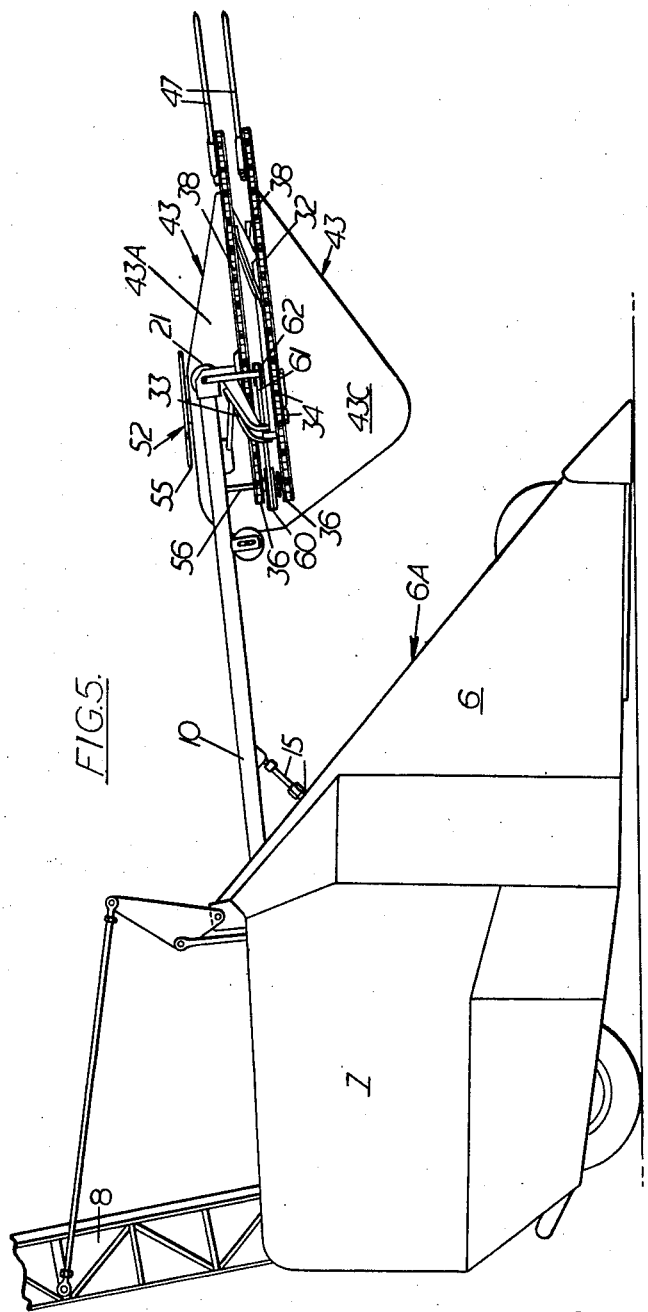

United States Patent Office 3,144,743
Patented Aug. 18, 1964

3,144,743
TOPPING DEVICE FOR SUGAR CANE HARVESTER
James Kenneth Gaunt, North Essendon, Victoria; James Wood, Sunshine, Victoria; and John Errington Douglas, Reservoir, Victoria, Australia, assignors to Massey-Ferguson (Australia) Limited, Victoria, Australia, a company of Victoria, Australia
Filed Mar. 27, 1961, Ser. No. 98,536
Claims priority, application Great Britain Mar. 31, 1960
5 Claims. (Cl. 56—17)

This invention relates to sugar cane harvesters and concerns, more particularly, a topping device for such harvesters.

When harvesting cane, it is desirable to sever and discharge the leafy tops of the standing cane before the stalk portions are cut down and fed into the body of the harvester. Because of the divergent disposition of the leafy cane tops and their inherently flimsy character, proper cane topping has been a difficult problem.

Accordingly, it is the primary aim of the invention to provide an efficient topping device for effectively severing and discharging the leafy tops of standing sugar cane.

In more detail, it is an object of the invention to provide a topping device of the above type which positively gathers and bunches the diverging leafy top portions of the cane into a relatively solid mass for effective clean cutting.

It is also an object to provide a topping device as characterized above which discharges the severed cane tops to one side of the harvester so that they do not foul the harvester mechanism or enter with the harvested cane.

Another object is to provide a topping device as above described which is fully adjustable to effectively handle various crop conditions.

Other objects and advantages of the invention will become apparent upon reading the following description and upon reference to the drawings, in which:

FIGURE 1 is a plan of a topping device constructed in accordance with the invention;

FIG. 2 is a side elevation of the device shown in FIG. 1;

FIG. 3 is an enlarged fragmentary section taken approximately on the line III—III in FIG. 1.

FIG. 4 is a fragmentary enlarged side elevation of the cutter mechanism which also appears in FIG. 2; and FIG. 5 is a fragmentary, reduced scale, side elevation of a typical cane harvester with the device of FIG. 1 shown mounted thereon.

While the invention will be described in connection with a preferred embodiment, it will be understood that we do not intend to limit the invention to that embodiment. On the contrary, we intend to cover all modifications, alternatives and equivalents which may be included within the spirit and scope of the invention as defined by the appended claims.

The sugar cane harvester with which the topping device of the present invention is primarily intended for use is a side mounted implement arranged for attachment to a tractor in side-by-side relation. As seen in FIG. 5, the tractor would be at the opposite side of the outlined harvester. The front portion of the harvesting implement consists of a pair of sidewalls 6, only one of which is shown, which are spaced laterally so that they define an open fronted passage that receives a row of standing sugar cane as the harvester is driven forwardly. The sidewalls 6 are formed with leading edges 6a which incline rearwardly so as to lift and guide the cane into the harvester.

Although not shown, it will be understood by those skilled in the art that the harvester includes, between the sidewalls 6, a low level cutter to sever the cane close to the ground and a conveyor mechanism to carry the cut cane to the rear portion of the implement which is shown enclosed by a casing 7. Conventionally, the casing 7 envelops an engine and a chopping device for severing the cane into short lengths which are then carried by a rear elevator 8 to a trailer or similar receptacle that is also hitched to the tractor.

The topping device of the present invention is carried by a pivoted arm 10 that extends forwardly from the casing 7 above the passage between the sidewalls 6. In the illustrated construction, the arm 10 is supported by a bracket 11 having bearings 12 which rotate on a shaft 13 that serves as the driving shaft of the topping device. The shaft 13 is driven by a belt pulley 14 from the main drive of the harvester and is supported at a high level towards the front of the casing 7.

To raise and lower the topping device, the arm 10 is supported by a hydraulic jack 15 that is anchored to a member 16 of the harvester frame. It can thus be seen that by extending or contracting the jack 15, the angle of the arm 10 about the shaft 13, and thus the vertical position of the topping device, can be adjusted.

At the forward end of the arm 10 a bracket 18 is mounted carrying a gear case 19 enclosing engaged bevel gears. The bevel gears are driven from the driving shaft 13 by a pulley 20 on the shaft 13 and a pulley 21 on the transverse shaft of the driving bevel gears, the pulleys 20, 21, being connected by a belt 22. A relatively massive hollow pillar 23 extends downwardly from the gear case 19 and encases a rotary shaft which is secured to a knife 24 which serves as the cutter of the topping mechanism. The pillar 23 depends from bearings on the transverse shaft of the gear case 19 so as to be swingably adjustable fore and aft of the harvester. In this way, the plane of the knife 24 can be regulated. The position of the pillar 23 is established by a link 26 that is pivotally conected to the pillar 23 and anchored in any selected one of several alternate positions, to a bracket 27 on the arm 10.

In the preferred construction, the knife 24 comprises a disc-like body to the rim of which are secured a series of peripherally spaced and radially extending cutter blades 28. The knife 24 thus cuts at its periphery in a generally horizontal plane.

Defining a path which converges toward the cutting knife 24 are two gathering components 31 and 32 supported by a structure including a bracket 25 that is bolted to the pillar 23 and which mounts a second bracket 30 by which the framework of the upper elongated gathering component 31 is carried. The supporting structure also includes a pair of stays 33 by which the framework of the lower elongated gathering component 32 is carried and a further pair of stays 34 brace the two components 31, 32 together. The two components diverge widely forwardly from a point of intersection, where the gathering component 31 crosses over the gathering component 32, at one side and behind the axis of rotation of the knife 24. In the illustrated construction, the upper component 31 diverges toward the right of the harvester whereas the lower component 32 diverges toward the left, and the point of intersection of the components is positioned to the left of the knife axis.

The cutting arc of the knife 24 thus traverses the converging space between the components 31, 32 just in front of the point of intersection, and this is the effective cutting region where the can is topped. The knife 24 is driven so that the blades 28 move from the upper component 31 toward the lower component 32.

Each gathering component is provided with endless conveyors which engage and hold the leafy cane tops for severing. The conveyors preferably comprise endless chains 38 which are led around sprocket wheels 36 and 37 at opposite ends of each of the components 31, 32. Each of the conveyor chains 38 include a plurality of spaced projections 39 which extend into and move along the converging path toward the cutting knife 24. The lower component 32 includes a shield 40 which shrouds the outer or return run of the chain 38 and its projections 39 on the component 32.

The components 31, 32 also carry a deflector plate 43 which has an active face of special formation. The plate 43 includes a vertical portion 43a which rises from the upper component 31 and extends past the left side of the gear case 19 to a point behind the cutter knife 24. The portion 43a merges into another vertical portion 43b which is deflected laterally to a slight degree and which curves downwardly in a vertical plane. The portion 43b merges into still another portion 43c which runs chute-like laterally and downwardly from the vertical portion 43b and curves upwardly and forwardly to the lower component 32. Thus, the portions 43a, 43b define a vertical, transverse screen lying roughly in the plane of the gathering component 31 and having an inclined forward edge and a rounded rear edge. The portion 43c of the deflector plate 43 defines a laterally opening chute sloping downwardly and to the left of the gathering component 32.

Both gathering components 31, 32 carry long forwardly extending rods 47 which diverge like a pair of feelers. Each of the rods preferably has an adjustable connection at 48 with the framework of the respective component on which it is mounted.

The illustrated construction also includes an upright post 50 fixed to the bracket 30, and the deflector plate 43 supports a bracket 51 at its upper end on which a high level rotary deflector 52 is journaled. The deflector includes a belt pulley 53 and four flexible rods 55 which extends like flails from above the pulley 53. The deflector is rotatably driven in the same direction as the knife 24, counterclockwise as viewed in FIG. 1, so as to assist in clearing the severed leafy tops of the can to the left of the harvester.

The driving gear of the topping device includes a belt and pulley drive from the knife shaft, which is driven from the gear box 19, to an upright shaft 56 which rotates in a lower bearing 57 carried on the upper gathering component 31 and an upper bearing supported by stays 59 rising from the upper component 31. The shaft 56 carries a pulley 60 which is driven by a belt 61 from a pulley 62 on the knife shaft. The sprocket wheel 36 of the upper conveyor chain 38 is secured to the shaft 56 and in this way the conveyor chain 38 is driven along its endless path under the guidance of the framework of the upper component 31.

The shaft 56 also has a belt pulley 65 from which the drive of the sprocket wheel 36 of the lower traveling chain 38 is taken by way of a cross belt 56 and a pulley 57 on a short vertical shaft 68 to which the sprocket wheel 36 of the lower component 32 is secured. The shaft 68 rotates in bearings 69 carried on the framework of the lower gathering component 32. Thus, the conveyor chain 38 of the lower gathering component is driven and guided in much the same manner as the upper conveyor chain.

The shaft 36 has still another pulley 70 from which the drive to the rotary deflector pulley 53 is taken by a belt 71.

In operation, the harvester is driven along a row of cane so that the leafy tops of the standing cane come between the widely spaced tips of the long rods 47 and are guided into the converging path defined by the components 31, 32. As the tops move into this path, they are engaged by the chains 38 and their projections 39. Preferably, the chains 38 are driven at a speed approximately equal to the ground speed of the harvester so that the ground speed of the projections 39 engaging the leafy cane tops is practically nil. Thus, the upper and lower components 31, 32 simply serve to gather the tops together and closely bunch them, holding the leafy tops as they are severed cleanly by the blades 28 on the knife 24. Since the blades 28 cut in the direction toward the lower component 32, the cutting action inherently deflects the butts of the cut-off tops to the left of the harvester and thus initiates the leftward discharge of the leafy cane tops.

The leafy tops are also abutted by the deflector plate portion 43a and are urged over the gathering component 32 and into the chute defined by the deflector plate portion 43c by the rotary flail deflector 52. The portion 43b of the deflector plate prevents the leafy tops from becoming fouled in the drive mechanism of the topping device.

It has been found that the rotary flail deflector 52 is not absolutely essential, guidance of the cut tops being well handled by the deflector plate 43, but that the deflector is useful when the leafy cane tops are particularly heavy and where adverse wind conditions are encountered.

We claim as our invention:

1. A topping mechanism for a sugar cane harvester comprising, in combination, an elongated arm, a rotary cutter journaled in a generally horizontal plane at the forward end of said arm, a pair of elongated gathering components mounted on said frame one above and the other below said cutter and diverging forwardly in generally horizontal planes so as to define a path which converges toward said cutter, each of said components carrying endless conveyors driven along said components so as to run along said path toward said cutter, said conveyors crossing one another at a point spaced rearwardly of the effective cutting arc of said cutter, and means driving said cutter so as to cut transversely of said path toward the lower gathering component.

2. A topping mechanism for a sugar cane harvester comprising, in combination, an elongated arm, a rotary cutter journaled in a generally horizontal plane at the forward end of said arm and having radially extending cutting knives, a pair of elongated gathering components mounted on said frame one above and the other below said cutter and diverging forwardly in generally horizontal planes so as to define a path which converges toward said cutter, each of said components carrying endless conveyors driven along said components so as to run along said path toward said cutter, said conveyors crossing one another at a point spaced rearwardly of the effective cutting arc of said cutter, said conveyors including a plurality of spaced projections extending into and moving along said converging paths, and means driving said cutter so that said knives cut transversely of said path toward the lower gathering component.

3. A topping mechanism for a sugar cane harvester comprising, in combination, an elongated arm, a rotary cutter journaled in a generally horizontal plane at the forward end of said arm, a pair of elongated gathering components mounted on said frame one above and the other below said cutter and diverging forwardly in generally horizontal planes so as to define a path which converges toward the cutter, said components crossing one another at a point spaced rearwardly of the effective cutting arc of said cutter, means driving said cutter so as to cut transversely of said path toward the lower gathering component, and a horizontally disposed flail journaled for rotation above the intersection of said components and being driven in the same direction of rotation as said cutter.

4. A topping mechanism for a sugar cane harvester comprising, in combination, an elongated arm, a rotary cutter journaled in a generally horizontal plane at the forward end of said arm, a pair of elongated gathering components mounted on said frame one above and the other below said cutter and diverging forwardly in generally horizontal planes so as to define a path which converges toward said cutter, said components crossing one another at a point spaced rearwardly of the effective cutting arc of said cutter, means for driving said cutters so as to cut transversely of said path toward the lower gathering component, and a deflector plate having a rising vertical portion mounted along the upper gathering component to a point behind said cutter and a curved chute-like portion running laterally and downwardly from said vertical portion and curving upwardly and forwardly to the lower gathering component.

5. A topping mechanism for a sugar cane harvester comprising, in combination, an elongated arm, a rotary cutter journaled in a generally horizontal plane at the forward end of said arm and having radially extending cutting knives, a pair of elongated gathering components mounted on said frame one above and the other below said cutter and diverging forwardly in generally horizontal planes so as to define a path which converges toward said cutter, each of said components carrying endless conveyors driven along said components so as to run along said path toward said cutter, said conveyors crossing one another at a point spaced rearwardly of the effective cutting arc of said cutter, said conveyors including a plurality of spaced projections extending into and moving along said converging paths, means for driving said cutter so that said knives cut transversely of said path for the lower gathering component, a deflector plate having a rising vertical portion mounted along the upper gathering component to a point behind said cutter and a curved chute-like portion running laterally and downwardly from said vertical portion and curving upwardly and forwardly to the lower gathering component, and a horizontally disposed flail journaled for rotation above said plate on a generally vertical axis behind the intersection of said conveyors and being driven in the same direction of rotation as said cutter.

References Cited in the file of this patent

UNITED STATES PATENTS

| | | |
|---|---|---|
| 2,516,277 | Vichie et al. | July 25, 1950 |
| 2,702,979 | Swingle | Mar. 1, 1955 |